May 3, 1966 R. S. RICHARDS ET AL 3,249,672
METHOD OF FORMING MOLDS FOR BLOWN PLASTIC ARTICLES
Filed March 21, 1963 2 Sheets-Sheet 1
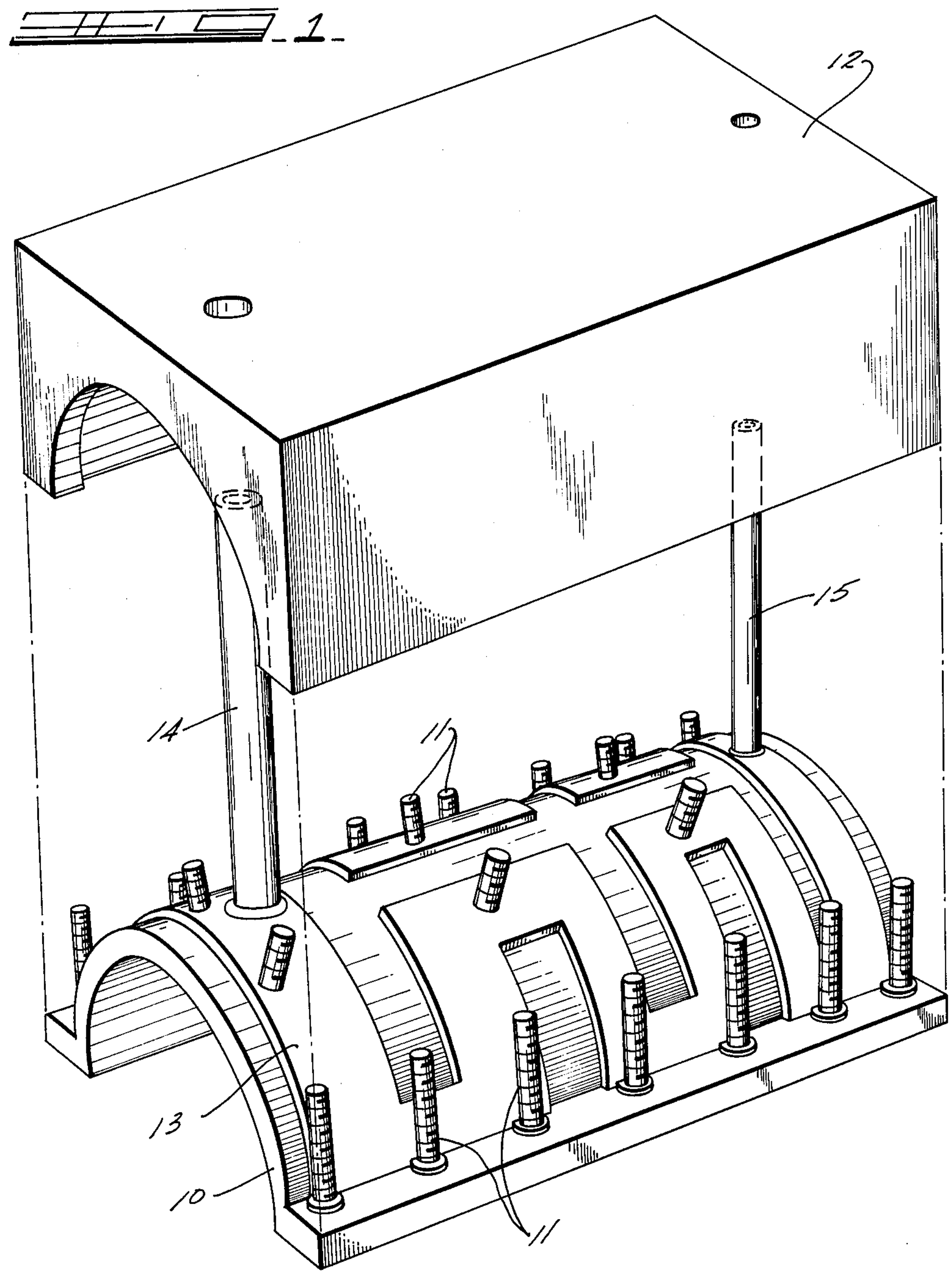
INVENTORS
RAYMOND S. RICHARDS
& OWEN M. SMALL
BY D. T. Innis &
W. A. Schaich
ATTORNEYS METHOD OF FORMING MOLDS FOR BLOWN PLASTIC ARTICLES
Filed March 21, 1963 2 Sheets-Sheet 2
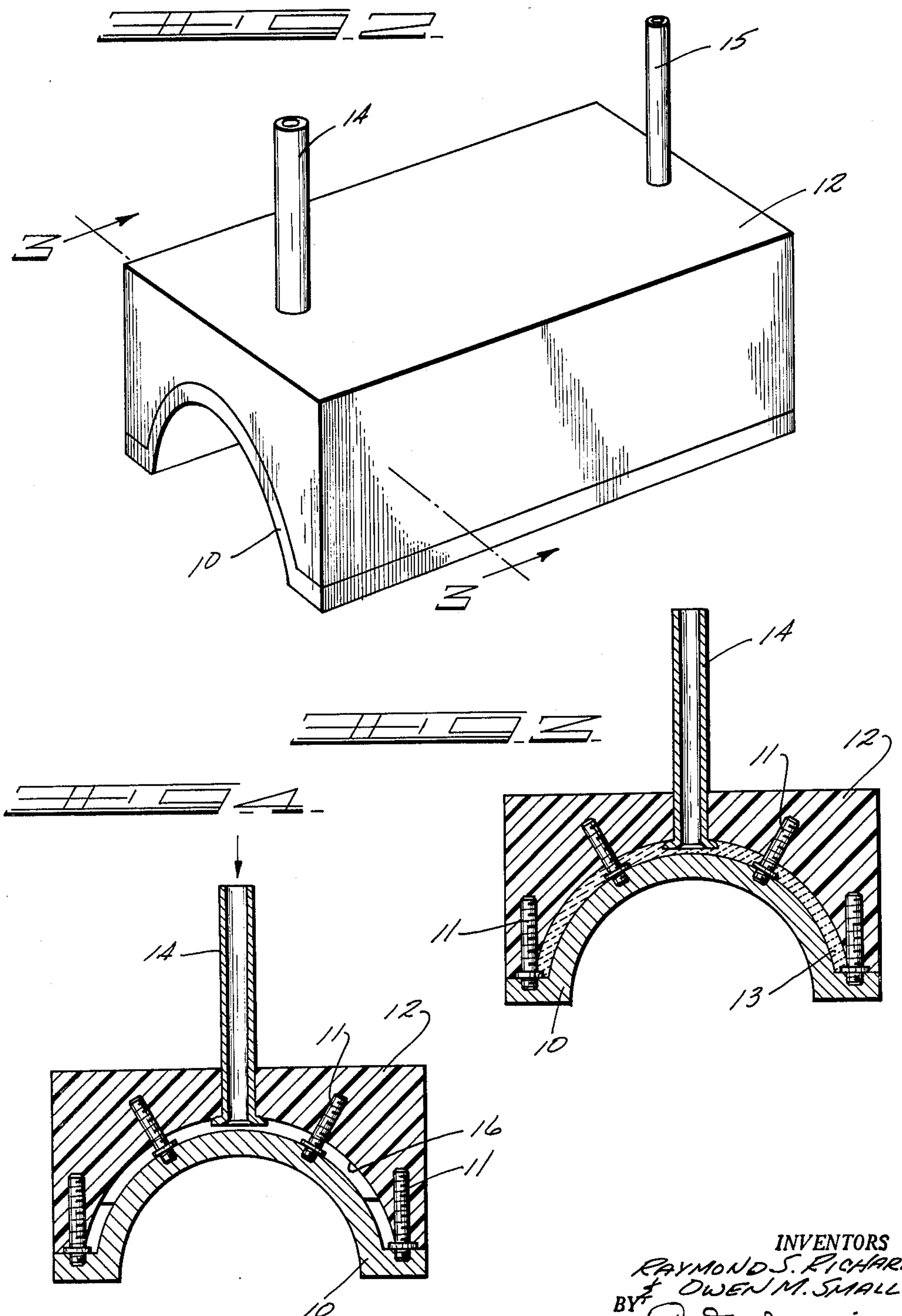
INVENTORS
RAYMOND S. RICHARDS
& OWEN M. SMALL
BY D. T. Innis &
W. A. Schaich
ATTORNEYS United States Patent Office 3,249,672
Patented May 3, 1966

3,249,672

METHOD OF FORMING MOLDS FOR BLOWN PLASTIC ARTICLES

Raymond S. Richards and Owen M. Small, Toledo, Ohio, assignors to Owens-Illinois, Inc.

Filed Mar. 21, 1963, Ser. No. 267,041
4 Claims. (Cl. 264—219)

This invention relates to a method of forming molds for blown plastic articles.

More particularly, this invention relates to a method of forming a mold for a blown plastic article in which the mold is composed of a metal shell backed by an epoxy resin and with coolant flow passages provided therein.

It has been the practice in the past to construct the blow molds, for use on machines for blowing plastic articles, entirely of aluminum, steel, zinc alloys and cast iron or other suitable metals. These all metal molds are relatively expensive to manufacture and necessarily are heavy, requiring supporting structure on the blow molding machine which is strong and durable enough to operate continuously over a long period of time without substantial wear.

A further consideration is the fact that the all metal molds require extremely accurate machining of the back and side surfaces which serve as the locating planes when the molds are mounted on the blowing apparatus. This accurate machining of the back and side surfaces of the mold contributes to better than half of the expense of the manufacture of the molds. As can readily be appreciated, when machining metals, it is necessary that this machining be done with extreme accuracy and obviously is time consuming.

The present invention concerns itself with forming mold equipment for blown plastic articles, in which the mold equipment is composed of a relatively thin metal shell which forms the molding surfaces, with the bulk of the mold being formed of an epoxy resin or other suitable plastic material which may be easily and relatively inexpensively machined to the specifications required for mounting the molds on the blow molding apparatus.

With the foregoing in mind, it is an object of this invention to provide a method of forming a blow mold in which the molding surface is formed of a relatively thin metal shell with the substantial bulk of the mold taken up by an epoxy resin or plastic material formed to and joined with the back of the mold.

It is an additional object of this invention to provide a method of forming an epoxy-backed blow mold for plastic items.

It is a still further object of this invention to provide a method of forming epoxy-backed, metal shell molds having cooling passages formed therein.

Other and further objects will be apparent from the following description taken in conjunction with the annexed sheets of drawings, wherein:

FIG. 1 is an exploded perspective view of the mold of the invention showing the epoxy backing separated from the metal shell and prior to removal of the coolant passage forming material;

FIG. 2 is a perspective view of the mold in its completed form;

FIG. 3 is a cross sectional view taken at line 3—3 of FIG. 2, showing the coolant passage forming material therein;

FIG. 4 is a cross-sectional view, similar to that of FIG. 3, but with the coolant passage forming material removed.

It has been applicants' experience in the making of molds for plastic container blowing machines, that the molds are expensive, require a great deal of machining and necessarily are of substantial weight. Furthermore, in the production of molds for plastic blowing machines, the major expense is in the machining of molds and since it is necessary to have a great many molds of different shapes and sizes so as to form containers having a range of shapes, a great deal of money is tied up in molds which may not be in continuous use.

With this in mind, applicants have invented a considerably less expensive mold which will perform more efficiently than the previous solid molds and have comparable production life to the conventional molds. Molds made in accordance with the invention are substantially cheaper to manufacture, lighter in weight and require less expensive machining.

With reference to the drawings, the mold of the invention consists of a metal shell 10 which, as illustrated, may be one-half of a complete blow mold. The metal shell is cast or electro-formed in the usual manner. Anchoring members 11, as shown, are threaded stub shafts threaded into suitable threaded openings formed in the back of the shell. In actual practice these shafts can be welded to the back of the metal shell. Obviously, the anchoring members 11 may take other forms, it being understood that it is only necessary that they make a good bond with a plastic formed therearound. The back of the metal shell may be rough and the only machining necessary in the metal shell would be in the surface against which the plastic is expanded during forming of the article and the faces which are to meet when the mold halves are closed to form the mold cavity.

As can readily be seen when viewing FIG. 1, a plurality of anchoring members 11 project from the back surface of the metal shell 10. The back of the metal shell is covered with a plastic 12 in the form of a block. The plastic is actually poured, while molten, into a form (not shown) which has the back of the metal shell as the bottom thereof. When the plastic has hardened it will form a substantially rectangular backing in intimate contact with the metal shell, as shown in FIG. 2. The anchoring members will insure that the plastic block 12 is firmly held to the back of the metal shell. It is important from the standpoint of successful, high speed operation of a plastic blow mold machine that the molds be cooled and maintained at a reduced temperature.

This cooling is provided by passages 15 formed between the plastic and metal shell over substantially the full area of the mold. While the passages are shown as relatively wide, it should be kept in mind that the size of the passages is relative and in the case where the shell is extremely thin, it may be necessary to make the passages narrow so as to provide sufficient backing for the shell in the form of a plurality of ribs of plastic. Obviously, where the shell is thin, large, unbacked areas cannot be tolerated since the shell may fail in use. The coolant passages may take any form so long as they provide substantial freedom of circulation of the coolant from an inlet to an outlet. The method of forming the molds of the invention with coolant passages is accomplished by placing a waxy substance 13 in a defined pattern onto the back of the metal shell prior to the pouring of the plastic so that the plastic 12 will come in contact with the metal shell only in those areas which are not covered by the waxy substance. With the waxy substance 13 in place on the back of the metal shell, as shown in FIG. 1, a pair of pipes 14 and 15, having flared lower ends, are pressed on the waxy substance at spaced points. It is important that the pipes not be pushed through the waxy substance, but merely held by the waxy substance, as will later be apparent.

With the tubes in place, as shown in FIG. 1, a rectangular open bottom chamber will be placed over the metal shell so that the metal shell will, in effect, form the bottom of a substantially rectangular cavity. Into this cavity is poured a heated plastic which will then flow into contact with the metal shell and assume the block form, shown in FIG. 2. The plastic 12 will firmly hold pipes 14 and 15 in the position shown in FIGS. 3 and 4.

After the epoxy is hardened, the shell 10 is heated sufficiently to render the waxy substance fluid so that it may be poured out of either pipe 14 or pipe 15. In this manner cooling passages will be provided between the metal shell 10 and the epoxy backing 12 through which water or any other suitable cooling fluid may be circulated. With this arrangement, heat may be effectively removed from the back of the metal shell, thus maintaining the molding surface of the metal shell at an optimum operating temperature.

As a specific example of the various materials used in the formation of the mold structure of the invention, the metal shell is formed of a ferrous metal, the waxy substance used is ordinary beeswax, the pipes 14 and 15 are made of copper tubing and the plastic used is a filled, hard castable epoxy commonly termed "tooling epoxy."

While applicants have specifically pointed out various materials used in the formation of the blow mold, it should be kept in mind that the metal shell could be formed of any suitable metal such as iron, steel, beryllium, and the pipes can likewise be made of such materials.

While the waxy substance is described as being beeswax, it could as well be any material which will withstand the temperature of the molten plastic being poured on the back of the shell, but which can be removed by heating or by dissolution by a solvent or aqueous solution introduced through the pipes 14 or 15. It will be readily appreciated that many materials have these properties. Preferably, the material should have a melting point less than 190° F.

Applicants have specifically disclosed the use of a hard, castable epoxy resin termed "tooling epoxy" as the plastic material forming the backing for the shell; however, other plastics would work equally well, provided they are sufficiently rigid at normal temperatures to provide precisely machined locating faces and are impact resistant to the normal opening and closing forces experienced in the operation of a blow molding machine.

Other and further modifications may be resorted to within the spirit and scope of the appended claims.

We claim:

1. The method of forming molds for blown plastic articles comprising the steps of casting a metal shell mold with integral anchoring members extending from the back thereof, placing a soluble waxy substance on selected portions of the back of the shell, partially imbedding one end of each of a pair of tubes in the waxy substance at spaced apart points, covering the entire back of said shell mold with an epoxy resin of greater thickness than the length of said anchoring members, and dissolving the waxy substance from between the epoxy and shell whereby an epoxy backed, shell mold is formed having coolant passages therein.

2. The method of forming molds for plastic articles comprising the steps of forming a pair of semi-cylindrical complementary metal shells, fixing a plurality of generally radially extending studs to the back of said shells, placing a soluble waxy substance on selected portions of the back of the shells, partially imbedding one end of each of a pair of tubes in the waxy substance at spaced-apart points, covering the entire back of said shell molds with a rigid plastic of greater thickness than the length of said studs, and dissolving the waxy substance from between the plastic and shells whereby epoxy backed, complementary shell molds are formed having coolant passages therein.

3. The method of claim 1, wherein the step of covering the back of the shell mold with epoxy resin comprises placing a substantially rectangular open bottom form about the circumference of the shell mold so that the shell mold closes the bottom of the form and pouring molten epoxy resin into the form to a depth sufficient to completely cover the anchoring members.

4. The method of claim 2, wherein the step of covering the entire back of the shell mold with epoxy resin comprises placing a substantially rectangular open bottom form about the circumference of the shell mold so that the shell mold closes the bottom of the form and pouring molten epoxy resin into the form to a depth sufficient to completely cover the studs.

References Cited by the Examiner

UNITED STATES PATENTS

| | | | |
|---|---|---|---|
| 1,677,241 | 7/1928 | Langermeier | 18—35 |
| 2,329,425 | 9/1943 | Steel | 18—35 |
| 2,790,998 | 5/1957 | Dimmer | 264—18 |
| 3,086,251 | 4/1963 | Bernat | 264—277 |
| 3,101,065 | 8/1963 | Kalis. | |
| 3,120,573 | 2/1964 | Gengrande et al. | 264—277 |

ALEXANDER H. BRODMERKEL, *Primary Examiner.*

B. SNYDER, *Assistant Examiner.*